United States Patent
Jagalla et al.

(10) Patent No.: US 9,136,909 B2
(45) Date of Patent: Sep. 15, 2015

(54) APPARATUS FOR MIMO COUPLING POWER LINE SIGNALS INTO A THREE-CONDUCTOR POWER SUPPLY NETWORK VIA TWO CHANNELS

(71) Applicants: Gerhard Jagalla, Aldenhoven (DE); Stephan Thiel, Aachen (DE)

(72) Inventors: Gerhard Jagalla, Aldenhoven (DE); Stephan Thiel, Aachen (DE)

(73) Assignee: devolo AG, Aachen (DE)

( * ) Notice: Subject to any disclaimer, the term of this patent is extended or adjusted under 35 U.S.C. 154(b) by 0 days.

(21) Appl. No.: 14/543,562

(22) Filed: Nov. 17, 2014

(65) Prior Publication Data

US 2015/0139342 A1    May 21, 2015

(30) Foreign Application Priority Data

Nov. 19, 2013   (DE) .................. 10 2013 019 287

(51) Int. Cl.
*H04B 3/54*   (2006.01)
*H04B 3/56*   (2006.01)

(52) U.S. Cl.
CPC ... *H04B 3/54* (2013.01); *H04B 3/56* (2013.01)

(58) Field of Classification Search
CPC ........... H04B 2203/00; H04B 2203/54; H04B 2203/5404; H04B 2203/5429; H04B 2203/5462; H04B 2203/5466; H04B 3/54; H04B 3/544; H04B 3/546; H04B 3/548; H04B 3/56
USPC .......................... 375/295, 296, 288, 220, 222
See application file for complete search history.

(56) References Cited

U.S. PATENT DOCUMENTS

| | | | |
|---|---|---|---|
| 3,659,280 A * | 4/1972 | Donohoo | 340/538.12 |
| 5,272,619 A * | 12/1993 | McQueen | 363/140 |
| 6,104,707 A * | 8/2000 | Abraham | 370/295 |
| 8,755,449 B2 * | 6/2014 | Maniktala | 375/258 |
| 2010/0246648 A1 * | 9/2010 | Rocamora et al. | 375/222 |
| 2014/0112400 A1 | 4/2014 | Reuven | |
| 2014/0192909 A1 * | 7/2014 | Grusdat | 375/258 |

FOREIGN PATENT DOCUMENTS

| | | |
|---|---|---|
| DE | 102011105392 A1 | 12/2012 |
| DE | 202006021117 U1 | 1/2013 |
| EP | 2525503 A1 | 11/2012 |
| WO | WO 2012/111003 A1 | 8/2012 |

OTHER PUBLICATIONS

"Powerline Telecommunication (PLT); MIMO PL T Part 1: Universal Coupler, Operating Instructions—Description; 00034v113", ETSI Draft; 00034v113, European Telecommunications Standards Institute (ETSI}, 650, Toute Des Lucioles; F-06921 Sophia Antipolis; France, Bd. PLT Nr. V1.1.3., Jul. 12, 2011, Seiten 1-25, XP014097419.

* cited by examiner

*Primary Examiner* — Siu Lee
(74) *Attorney, Agent, or Firm* — Reinhart Boerner Van Deuren P.C.

(57) ABSTRACT

The present invention relates to an apparatus for coupling a modem to a power supply network for transmitting data via the power supply network, comprising a mains connection, which is configured to connect the apparatus to a phase conductor, a neutral conductor and a protective earth conductor of the power supply network, with the apparatus comprising a first transformer element comprising a primary side winding, a first secondary side winding and a second secondary side winding, and with the apparatus comprising a second transformer element comprising a primary side winding, a first secondary side winding and a second secondary side winding.

13 Claims, 5 Drawing Sheets

US 9,136,909 B2

APPARATUS FOR MIMO COUPLING POWER LINE SIGNALS INTO A THREE-CONDUCTOR POWER SUPPLY NETWORK VIA TWO CHANNELS

CROSS-REFERENCE TO RELATED PATENT APPLICATIONS

This patent application claims priority to German Application No. 10 2013 019 287.0, filed on Nov. 19, 2013, the entire teachings and disclosure of which are incorporated herein by reference thereto.

FIELD OF THE INVENTION

The present subject matter relates to an apparatus for coupling a modem to a power supply network for transmitting data via the power supply network.

BACKGROUND OF THE INVENTION

Power line communication (PLC) is a technology that transmits data through energy supply networks. An energy supply network can be both a low-voltage installation inside a house and a supply network outside the house, or the medium-voltage and high-voltage lines in the large interconnected systems of the energy providers.

To this end, PLC modulates the data to be transmitted as high-frequency signals onto the electric lines of the energy supply network. In the current technical implementations, the frequencies used range between 9 kHz and 100 MHz, wherein said frequency range can be expanded up and/or down. "Diversity" in connection with PLC technology describes the transmission of PLC signals with the aid of further conductors.

SUMMARY OF THE INVENTION

In light of the previously identified disadvantages, it was the object of the present invention to provide an apparatus for achieving diversity for PLC systems that allows for easy implementation.

In the present case, this object is achieved by an apparatus for coupling a modem to a power supply network for transmitting data via the power supply network, comprising: a mains connection that is arranged to connect the apparatus to a phase conductor, a neutral conductor and a protective earth conductor of the power supply network, a first transformer element comprising a primary side winding, a first secondary side winding and a second secondary side winding, a second transformer element comprising a primary side winding, a first secondary side winding and a second secondary side winding, with the primary side winding of the first transformer element being connected in series to the primary side winding of the second transformer element, with the first secondary side winding of the second transformer element being connected in series to the second secondary side winding of the first transformer element, with the first secondary side winding of the first transformer element being connected in series to the second secondary side winding of the second transformer element, with the apparatus comprising a first primary side contact that is arranged at the end of the primary side winding of the first transformer element facing away from the primary side winding of the second transformer element, and comprising a second primary side contact that is arranged at the end of the primary side winding of the second transformer element facing away from the primary side winding of the first transformer element, and comprising a third primary side contact that is arranged between the primary side winding of the first transformer element and the primary side winding of the second transformer element, and comprising a first secondary side contact that is arranged at the end of the first secondary side winding of the first transformer element facing away from the second secondary side winding of the second transformer element, and comprising a second secondary side contact that is arranged at the end of the second secondary side winding of the second transformer element facing away from the first secondary side winding of the first transformer element, and comprising a third secondary side contact that is arranged at the end of the second secondary side winding of the first transformer element facing away from the first secondary side winding of the second transformer element, and comprising a fourth secondary side contact that is arranged at the end of the first secondary side winding of the second transformer element facing away from the second secondary side winding of the first transformer element, with the first primary side contact, the second primary side contact and the third primary side contact being each configured to be connected via the mains connection to different conductors chosen from a phase conductor, a neutral conductor and a protective earth conductor of the power supply network, and with the apparatus being configured to couple, at least in terms of high frequency, a first secondary side transmission channel, which is provided between the first and second secondary side contacts, to the power supply network via the first and second transformer element; and with the apparatus being configured to couple, at least in terms of high frequency, a second secondary side transmission channel, which is provided between the third and fourth secondary side contacts, to the power supply network via the first and second transformer element.

In the present case, this object is furthermore achieved by a modem for transmitting data via a power supply network, comprising the above-described apparatus, with the modem being connected to the power supply network via the first transmission channel with the first and second secondary side contact of the apparatus for coupling the modem, and with the modem being connected to the power supply network via the second transmission channel with the third and fourth secondary side contact for coupling the modem.

The modem is therefore a PLC modem that is configured for transmitting data via a power supply network.

The mains connection may, for example, comprise a first contact that is connected to the first primary side contact, and a second contact that is connected to the second primary side contact, and a third contact that is connected to the third primary side contact, with the first contact, the second contact and the third contact of the mains connection being each connected to different conductors chosen from a phase conductor, a neutral conductor and a protective earth conductor of the power supply network when the mains connection is connected to the power supply network. The connection may be, for example, a power plug, or it may be connected to a power plug. A PLC modem for coupling and/or decoupling PLC signals may be connected, for example, to the first and second secondary side contact and to the third and fourth secondary side contact.

The apparatus comprises a first transformer element comprising a primary side winding, a first secondary side winding and a second secondary side winding. The primary side winding of the first transformer element is thus inductively coupled to both the first secondary side winding and the second secondary side winding of the first transformer element. For example, the primary side winding, the first secondary side winding and the second secondary side winding of the first transformer element can be arranged on a joint transformer core such that essentially the same first magnet flux flows through the primary side winding, the first secondary side winding and the second secondary side winding of the first transformer element.

The apparatus comprises, moreover, a second transformer element comprising a primary side winding, a first secondary side winding and a second secondary side winding. The primary side winding of the second transformer element is thus inductively coupled to both the first secondary side winding and the second secondary side winding of the second transformer element. For example, the primary side winding, the first secondary side winding and the second secondary side winding of the second transformer element can be arranged on a joint transformer core such that essentially the same second magnet flux flows through the primary side winding, the first secondary side winding and the second secondary side winding of the second transformer element. Preferably, this second magnet flux may be essentially or fully decoupled from the first magnet flux flowing through the primary side winding, the first secondary side winding and the second secondary side winding of the first transformer element.

For example, the first transformer element and the second transformer element may each represent a separately provided transformer. However, the first transformer element and the second transformer element may also constitute, for example, part of a multi-hole core transformer, such as a double-hole core transformer.

The primary side winding of the first transformer element is connected in series to the primary side winding of the second transformer element, and the first secondary side winding of the second transformer element is connected in series to the second secondary side winding of the first transformer element. The first secondary side winding of the first transformer element is, moreover, connected in series to the second secondary side winding of the second transformer element.

The apparatus comprises, moreover, a first primary side contact that is arranged at the end of the primary side winding of the first transformer element facing away from the primary side winding of the second transformer element, and a second primary side contact that is arranged at the end of the primary side winding of the second transformer element facing away from the primary side winding of the first transformer element, and a third primary side contact that is arranged between the primary side winding of the first transformer element and the primary side winding of the second transformer element.

The first primary side contact and the second primary side contact are configured to be each connected via the mains connection to a different conductor chosen from a phase conductor and a neutral conductor of the power supply network, and the third primary side contact is configured to be connected via the mains connection to a protective earth conductor of the power supply network, for example by inserting a power plug into an outlet of the power supply network.

The apparatus comprises, moreover, a first secondary side contact that is arranged at the end of the first secondary side winding of the first transformer element facing away from the second secondary side winding of the second transformer element, a second secondary side contact that is arranged at the end of the second secondary side winding of the second transformer element facing away from the first secondary side winding of the first transformer element, a third secondary side contact that is arranged at the end of the second secondary side winding of the first transformer element facing away from the first secondary side winding of the second transformer element, and a fourth secondary side contact that is arranged at the end of the first secondary side winding of the second transformer element facing away from the second secondary side winding of the first transformer element.

The apparatus is configured to couple, at least in terms of high frequency, a first secondary side transmission channel K1, which is provided between the first and second secondary side contacts, to the power supply network via the first and second transformer element; and the apparatus is configured to couple, at least in terms of high frequency, a second secondary side transmission channel K2, which is provided between the third and fourth secondary side contacts, to the power supply network via the first and second transformer element. High frequencies in terms of PLC transmission may be, for example, frequencies of more than 1 kHz or more than 9 kHz or more than 100 kHz or more than 1 MHz.

In order to couple or decouple PLC signals, a PLC modem may be, for example, connected to the power supply network via a first transmission channel K1 with the first and second secondary side contact of the apparatus for coupling the modem, and to couple or decouple PLC signals, the PLC modem may be connected to the power supply network via a second transmission channel K2 with the third and fourth secondary side contact for coupling the modem. For example, a MIMO (multi-input/multiple-output) coupling of the PLC modem to the power supply network can thus be achieved via the two transmission channels K1 and K2, wherein, for example, a diversity gain can be achieved by using the two transmission channels K1 and K2 as two independent SISO (single-input/single-output) channels within the scope of a multi-layer transmission. The apparatus can be furthermore used for realizing single-layer transmission with diversity gain, with one channel of one of the types MIMO, MISO (multiple-input/single-output) or SIMO (single-input/multiple-output) being optimized for one single data stream ("single-layer transmission") by means of a diversity procedure, such as maximum ratio combining (e.g. beam-forming), selection combining or any other suitable diversity procedure. The PLC modem, for example, is configured to perform such a diversity procedure.

For example, no devices acting as low-pass filters, such as coils, are arranged between the first primary side contact and the first contact of the mains connection, between the second primary side contact and the third contact of the mains connection and between the third primary side contact and the second contact of the mains connection. Preferably, however, a capacitor having a capacity of, for example, 4.7 nF or other capacity may be arranged, for example, between the first primary side contact and the first contact of the mains connection and/or between the second primary side contact and the third contact of the mains connection and/or between the third primary side contact and the second contact of the mains connection. Said capacitors may be, for example, configured to filter out the 50 Hz line voltage or the 60 Hz line voltage.

A diversity gain can be simply achieved by using the two transmission channels with the coupling variant described by the apparatus for coupling a PLC modem to a power supply network for transmitting data via the power supply network.

According to an advantageous embodiment, it is proposed for the first transformer element and the second transformer element to be each part of a joint multi-hole core transformer.

The primary side winding of the first transformer element and the first and second secondary side winding of the first transformer element may be wound about a first joint hole of the multi-hole core transformer. The primary side winding of the first transformer element, the first secondary side winding and the second secondary side winding of the first transformer element are thus arranged on one part of the multi-hole core surrounding the first hole such that essentially the same first magnet flux flows through the primary side winding of the first transformer element, the first secondary side winding and the second primary side winding of the first transformer element.

The primary side winding of the second transformer element and the first and second secondary side winding of the second transformer element are wound about a second joint hole of the multi-hole core transformer. The primary side winding of the second transformer element, the first secondary side winding and the second primary side winding of the second transformer element are thus arranged on one part of the multi-hole core surrounding the second hole such that essentially the same second magnet flux flows through the primary side winding of the second transformer element, the first secondary side winding and the second primary side winding of the second transformer element.

Preferably, this second magnet flux may be essentially or fully decoupled from the first magnet flux flowing through the primary side winding, the first secondary side winding and the second secondary side winding of the first transformer element.

Using a multi-hole core transformer instead of two individual transformers for the first or respectively second transformer element allows, for example, for reducing the costs and, at the same time, space requirements, as only one transformer is being used.

Using a multi-hole core transformer may, moreover, allow for improved broadband transmission characteristics over single-hole core transformers, in particular when, for example, striving for a good coupling between windings with a relatively low number of windings across a wide frequency range, as is the case with the broadband frequency range of a PLC signal. Furthermore, by using a multi-hole core transformer instead of a single-core transformer one may also achieve a greater signal separation between the two transmission channels. Moreover, using a multi-hole core transformer instead of a single-core transformer may be more cost-efficient and require less space in the electrical system, such as a printed board.

The multi-hole core of the multi-hole core transformer may, for example, feature exactly two holes or more than two holes.

According to an advantageous embodiment, it is proposed for the multi-hole core transformer to constitute a double-hole core transformer having a first hole and a second hole, with the primary side winding and the first and second secondary side winding of the first transformer element being wound about the first hole of the double-hole core transformer and with the primary side winding and the first and second secondary side winding of the second transformer element being wound about the second hole of the double-hole core transformer.

According to an advantageous embodiment, it is proposed for the series connection of the first secondary side winding of the second transformer element and the second secondary side winding of the first transformer element, the sense of winding between the first secondary side winding of the second transformer element and the primary side winding of the second transformer element, and the sense of winding between the second secondary side winding of the first transformer element and the primary side winding of the first transformer element to be designed such that a positive voltage applied between the fourth secondary side contact and the third secondary side contact causes the following: (i) induction of a first voltage between the third primary side contact and the first primary side contact, (ii) induction of a second voltage between the second primary side contact and the third primary side contact, with the first voltage having a reverse direction as compared to the second voltage.

According to an advantageous embodiment, it is proposed for the positive voltage applied between the fourth secondary side contact and the third secondary side contact to cause one of the following: (i) induction of the first voltage as negative voltage between the third primary side contact and the first primary side contact and induction of the second voltage as positive voltage between the second primary side contact and the third primary side contact; and (ii) induction of the first voltage as positive voltage between the third primary side contact and the first primary side contact and induction of the second voltage as negative voltage between the second primary side contact and the third primary side contact.

According to an advantageous embodiment, it is proposed for the winding ratio between the primary side winding of the first transformer element and the primary side winding of the second transformer element, for the winding ratio between the first secondary side winding of the first transformer element and the second secondary side winding of the second transformer element, and for the winding ratio between the second secondary side winding of the first transformer element and the first secondary side winding of the second transformer element to be approximately 1:1. With said winding ratios, it is possible to achieve an approximate or complete symmetry in terms of coupling and/or decoupling.

According to an advantageous embodiment, it is proposed for the series connection of the first secondary side winding of the first transformer element and the second secondary side winding of the second transformer element, the sense of winding between the first secondary side winding of the first transformer element and the primary side winding of the first transformer element, and the sense of winding between the second secondary side winding of the second transformer element and the primary side winding of the second transformer element to be designed such that a positive voltage applied between the second secondary side contact and the first secondary side contact causes the following: (i) induction of a first voltage between the third primary side contact and the first primary side contact, (ii) induction of a second voltage between the second primary side contact and the third primary side contact, with the first voltage having the same direction as the second voltage.

According to an advantageous embodiment, it is proposed for the positive voltage applied between the second secondary side contact and the first secondary side contact to cause one of the following: (i) induction of the first voltage as positive voltage between the third primary side contact and the first primary side contact and induction of the second voltage as positive voltage between the second primary side contact and the third primary side contact; and (ii) induction of the first voltage as negative voltage between the third primary side contact and the first primary side contact and induction of the second voltage as negative voltage between the second primary side contact and the third primary side contact.

According to an advantageous embodiment, it is proposed for the winding ratio between the first secondary side winding of the first transformer element and the primary side winding of the first transformer element and for the winding ratio between the second secondary side winding of the second transformer element and the primary side winding of the second transformer element to be each (i) approximately 1:1 or (ii) approximately between 1:1 and 2:1.

Here and hereinafter, the term "approximately" may be understood to mean, for example, that a departure of less than 35% from the nominal value or less than 10% from the nominal value or less than 5% from the nominal value or less than 1% from the nominal value is approximately equal to the nominal value. In case of a departure of, for example, less than 10% and an approximate winding ratio of 1:1, winding ratios between 0.9:1.1 and 1.1:0.9 would fall below the approximate winding ratio of 1:1.

According to an advantageous embodiment, it is proposed for the winding ratio between the second secondary side winding of the first transformer element and the primary side winding of the first transformer element and for the winding ratio between the first secondary side winding of the second transformer element and the primary side winding of the second transformer element to be each (i) approximately 1:1 or (ii) approximately between 2:1 and 4:1.

According to an advantageous embodiment, it is proposed for the first primary side contact to be designed for being connected to a conductor chosen from a phase conductor and neutral conductor and for the second primary side contact to be designed for being connected to the other conductor chosen from a phase conductor and neutral conductor, with the third primary side contact being designed to be connected to the protective earth conductor.

According to an advantageous embodiment, it is proposed for the mains connection to comprise a CEE ("Commission on the Rules for the Approval of the Electrical Equipment") 7/4 compatible safety plug.

According to one advantageous exemplary embodiment, it is proposed that the power connector comprises a safety plug with earthing contact which is compatible with a NEMA connector.

As an example, a plug compatible with one selected of NEMA 5 (e.g. NEMA 5-15, or 5-20, or 5-30 or 5-50), NEMA 6 (e.g. NEMA 6-15, or 6-20, or 6-30, or 6-50), NEMA 10 (e.g. NEMA 10-30, or 10-50), NEMA 14 (e.g. NEMA 14-20, or 14-30, or 14-50), NEMA TT-30, NEMA ML-2, NEMA L5, NEMA L6, NEMA L7, NEMA L9, NEMA L14, NEMA L15, NEMA L16, NEMA L17, NEMA L18, NEMA L21, NEMA L22 and NEMA L23 (NEMA—US "National Electrical Manufacturers Association") may be used. It has to be understood that other NEMA compatible plugs may also be used.

BRIEF DESCRIPTION OF THE DRAWINGS

The invention is described hereinafter in detail based on drawings showing embodiments. The following figures show the following.

DETAILED DESCRIPTION OF THE INVENTION

Figure 1:
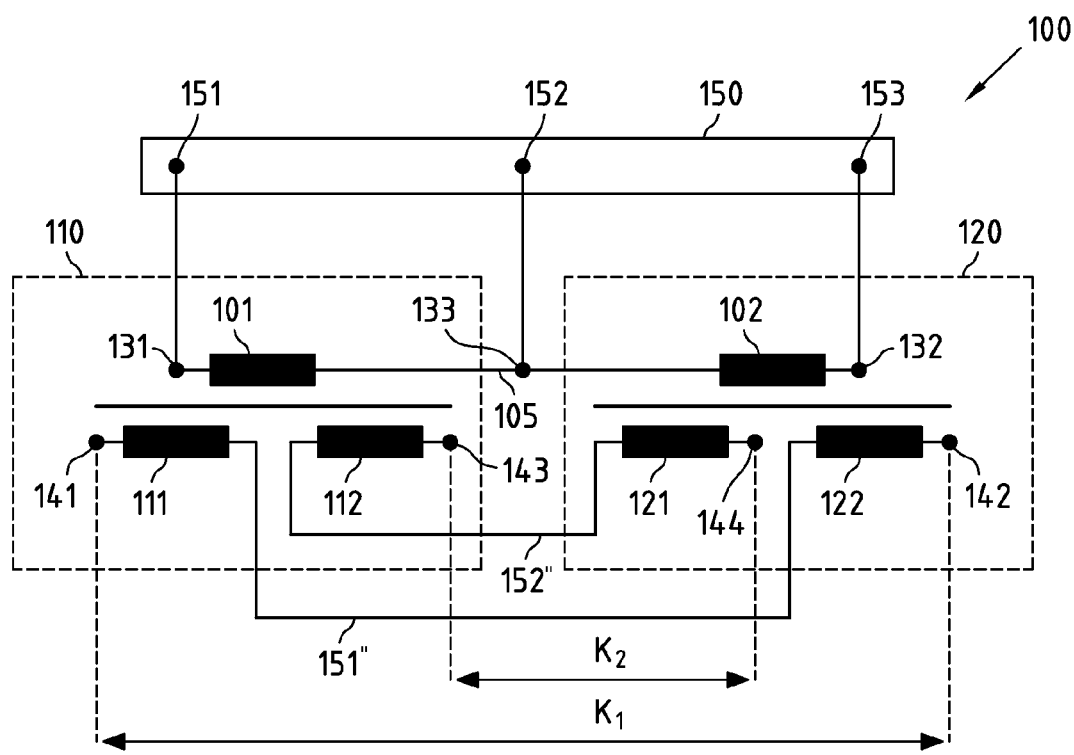
FIG. 1 shows an exemplary apparatus according to a first embodiment.

FIG. 1 shows an exemplary apparatus 100 according to a first embodiment.

The apparatus 100 is configured to couple a PLC modem (that is not shown in FIG. 1) to a power supply network for transmitting data via the power supply network. The apparatus 100 may be, for example, part of such a PLC modem.

The apparatus 100 comprises a mains connection 150 that is configured to connect the apparatus 100 with a phase conductor, a neutral conductor and a protective earth conductor of the power supply network. The mains connection 150 comprises, for example, a first contact 151, a second contact 152 and a third contact 153, with one of these three contacts 151, 152, 153 being connected to a different conductor chosen from phase conductor, neutral conductor and protective earth conductor of the power supply network when mains connection 150 is connected to the power supply network. The connection 150 may be, for example, a power plug, or it may be connected to a power plug.

The apparatus 100 comprises a first transformer element 110 comprising a primary side winding 101, a first secondary side winding 111 and a second secondary side winding 112. The primary side winding 101 of the first transformer element 110 is thus inductively coupled to both the first secondary side winding 111 and the second secondary side winding 112 of the first transformer element 110. For example, the primary side winding 101, the first secondary side winding 111 and the second primary side winding 112 of the first transformer element 110 can be arranged on a joint transformer core such that essentially the same first magnet flux flows through the primary side winding 101, the first secondary side winding 111 and the second primary side winding 112 of the first transformer element 110.

The apparatus 100 comprises, moreover, a second transformer element 120 comprising a primary side winding 102, a first secondary side winding 121 and a second secondary side winding 122. The primary side winding 102 of the second transformer element 120 is thus inductively coupled to both the first secondary side winding 121 and the second secondary side winding 122 of the second transformer element 120. For example, the primary side winding 102, the first secondary side winding 121 and the second primary side winding 122 of the second transformer element 120 can be arranged on a joint transformer core such that essentially the same second magnet flux flows through the primary side winding 102, the first secondary side winding 121 and the second primary side winding 122 of the second transformer element 120. Preferably, this second magnet flux may be essentially or fully decoupled from the first magnet flux flowing through the primary side winding 101, the first secondary side winding 111 and the second primary side winding 112 of the first transformer element 110.

For example, the first transformer element 110 and the second transformer element 120 may each represent a separately provided transformer. However, the first transformer element 110 and the second transformer element 120 may also constitute, for example, part of a multi-hole core transformer, such as a double-hole core transformer.

The primary side winding 101 of the first transformer element 110 is connected in series 105 to the primary side winding 102 of the second transformer element 120, and the first secondary side winding 121 of the second transformer element 120 is connected in series 152" to the second secondary side winding 112 of the first transformer element 110. The series connections 105, 152" that are shown exemplarily in FIG. 1 are not to be understood restrictively, but only as examples.

The first secondary side winding 111 of the first transformer element 110 is, moreover, connected in series 151" to the second secondary side winding 122 of the second transformer element 120. The series connection 151" that is shown exemplarily in FIG. 1 is not to be understood restrictively, but only as an example.

The apparatus 100 comprises, moreover, a first primary side contact 131 that is arranged at the end of the primary side winding 101 of the first transformer element 110 facing away from the primary side winding 102 of the second transformer element 120, a second primary side contact 132 that is arranged at the end of the primary side winding 102 of the second transformer element 120 facing away from the primary side winding 101 of the first transformer element 110, and a third primary side contact 133 that is arranged between the primary side winding 101 of the first transformer element 110 and the primary side winding 102 of the second transformer element 120 and thus between the series connection 105 of the primary side winding 101 of the first transformer element 110 and the primary side winding 102 of the second transformer element 120.

The first primary side contact 131 and the second primary side contact 132 are configured to be each connected via the mains connection 150 to a different conductor chosen from a phase conductor and a neutral conductor of the power supply network, and the third primary side contact 133 is configured to be connected via the mains connection to a protective earth conductor of the power supply network, for example by inserting a power plug into an outlet of the power supply network.

The apparatus comprises, moreover, a first secondary side contact 141 that (in relation to the electrical series connection 151" of the first secondary side winding 111 of the first transformer element 110 and the second secondary side winding 122 of the second transformer element) is arranged at the end of the first secondary side winding 111 of the first transformer element 110 facing away from the second secondary side winding 122 of the second transformer element 120, a second secondary side contact 142 that (in relation to the electrical series connection 151" of the first secondary side winding 111 of the first transformer element 110 and the second secondary side winding 122 of the second transformer element) is arranged at the end of the second secondary side winding 122 of the second transformer element 120 facing away from the first secondary side winding 111 of the first transformer element 110, a third secondary side contact 143 that (in relation to the electrical series connection 152" of the second secondary side winding 112 of the first transformer element 110 and the first secondary side winding 121 of the second transformer element) is arranged at the end of the second secondary side winding 112 of the first transformer element 110 facing away from the first secondary side winding 121 of the second transformer element 120, and a fourth secondary side contact 144 that (in relation to the electrical series connection 152" of the second secondary side winding 112 of the first transformer element 110 and the first secondary side winding 121 of the second transformer element) is arranged at the end of the first secondary side winding 121 of the second transformer element 120 facing away from the second secondary side winding 112 of the first transformer element 110.

The apparatus 100 is configured to couple, at least in terms of high frequency, a first secondary side transmission channel K1, which is provided between the first and second secondary side contacts 141, 142, to the power supply network via the first and second transformer element 110, 120; and the apparatus 100 is configured to couple, at least in terms of high frequency, a second secondary side transmission channel K2, which is provided between the third and fourth secondary side contacts 143, 144, to the power supply network via the first and second transformer element 110, 120. High frequencies in terms of PLC transmission may be, for example, frequencies of more than 1 kHz or more than 9 kHz or more than 100 kHz or more than 1 MHz.

In order to couple or decouple PLC signals, a PLC modem may be, for example, connected to the power supply network via a first transmission channel K1 with the first and second secondary side contact 141, 142 of the apparatus 100 for coupling the modem, and to couple or decouple PLC signals, the PLC modem may be connected to the power supply network via a second transmission channel K2 with the third and fourth secondary side contact 143, 144 for coupling the modem. For example, a MIMO (multi-input/multiple-output) coupling of the PLC modem to the power supply network can thus be achieved via the two transmission channels K1 and K2, wherein a diversity gain can be achieved by using the two transmission channels K1 and K2.

For example, no devices acting as low-pass filters, such as coils, are arranged between the first primary side contact 131 and the first contact 151 of the mains connection 150, between the second primary side contact 132 and the third contact 153 of the mains connection 150 and between the third primary side contact 133 and the second contact 152 of the mains connection 150. Preferably, however, a capacitor having a capacity of, for example, 4.7 nF or other capacity may be arranged, for example, between the first primary side contact 131 and the first contact 151 of the mains connection 150 and/or between the second primary side contact 132 and the third contact 153 of the mains connection 150 and/or between the third primary side contact 133 and the second contact 152 of the mains connection 150 (not shown in FIG. 1a). Said capacitors may be, for example, configured to filter out a 50 Hz line voltage (or other line frequency, for example 60 Hz or the like).

The winding ratio between the primary side winding 101 of the first transformer element 110 and the primary side winding 102 of the second transformer element 120, the winding ratio between the first secondary side winding 111 of the first transformer element 110 and the second secondary side winding 122 of the second transformer element 120, and the winding ratio between the second secondary side winding 112 of the first transformer element 110 and the first secondary side winding 121 of the second transformer element 120 is approximately 1:1. With said winding ratios, it is possible to achieve an approximate or complete symmetry in terms of coupling and/or decoupling.

The term "approximately" may be understood to mean, for example, that a departure of less than 35% from the nominal value or less than 10% from the nominal value or less than 5% from the nominal value or less than 1% from the nominal value is approximately equal to the nominal value. In case of a departure of, for example, less than 10% and an approximate winding ratio of 1:1, winding ratios between 0.9:1.1 and 1.1:0.9 would fall below the approximate winding ratio of 1:1.

The winding ratio between the first secondary side winding 111 of the first transformer element 110 and the primary side winding 101 of the first transformer element 110 and the winding ratio between the second secondary side winding 122 of the second transformer element 120 and the primary side winding 102 of the second transformer element 120 is, for example, (i) approximately 1:1 or (ii) approximately between 1:1 and 2:1.

The winding ratio between the second secondary side winding 112 of the first transformer element 110 and the primary side winding 101 of the first transformer element 110 and the winding ratio between the first secondary side winding 121 of the second transformer element 120 and the primary side winding 102 of the second transformer element 120 is, for example, (i) approximately 1:1 or (ii) approximately between 2:1 and 4:1.

For example, the winding ratio between the first secondary side winding 111 of the first transformer element 110 and the primary side winding 101 of the first transformer element 110 and the winding ratio between the second secondary side winding 122 of the second transformer element 120 and the primary side winding 102 of the second transformer element 120 may be approximately 1:2 and, at the same time, the winding ratio between the second secondary side winding 112 of the first transformer element 110 and the primary side winding 101 of the first transformer element 110 and the winding ratio between the first secondary side winding 121 of the second transformer element 120 and the primary side winding 102 of the second transformer element 120 may be, for example, also approximately 1:2. This means that MIMO decoupling may be achieved, for example, through the power supply network without increasing the transmission level.

The apparatus 100 is, for example, configured such that the series connection 151" of the first secondary side winding 111 of the first transformer element 110 and the second secondary side winding 121 of the second transformer element 120, the sense of winding between the first secondary side winding 111 of the first transformer element 110 and the primary side winding 101 of the first transformer element 110, and the sense of winding between the second secondary side winding 121 of the second transformer element 120 and the primary side winding 102 of the second transformer element 120 are designed such that a positive voltage $U_1$ applied between the second secondary side contact 142 and the first secondary side contact 141 causes the following: (i) induction of a first voltage Um between the third primary side contact 133 and the first primary side contact 131, (ii) induction of a second voltage $U_{1,2}$ between the second primary side contact 132 and the third primary side contact 133, with the first voltage $U_{1,1}$ having the same direction as the second voltage $U_{1,2}$.

According to this exemplary coupling variant for the first channel K1, the apparatus 100 is configured such that such a positive voltage $U_1$ applied between the second secondary side contact 142 and the first secondary side contact 141 (i.e., the voltage potential of the second secondary side contact 142 is higher than the voltage potential of the first secondary side contact 141) causes an induction of a first voltage $U_{1,1}$ between the third primary side contact 133 and the first primary side contact 131 through inductive coupling between the first secondary side winding 111 and the primary side winding 101 of the first transformer element 110 and an induction of a second voltage $U_{1,2}$ between the second primary side contact 132 and the third primary side contact 133 through inductive coupling between the second secondary side winding 122 and the primary side winding 102 of the second transformer element 120 (disregarding the influence of any voltage $U_2$ possibly applied at the second channel K2, i.e., for example, $U_2$ can be assumed to be 0V), with the first voltage $U_{1,1}$ having the same direction as the second voltage $U_{1,2}$. This means that the apparatus 100 can be, for example, configured such that, for example, the first voltage $U_{1,1}$ induced by $U_1$ is a positive voltage between the third primary side contact 133 and the first primary side contact 131 (i.e., the voltage potential of the third primary side contact 133 is higher than the voltage potential of the first secondary side contact 131), and the second voltage $U_{1,2}$ induced by $U_1$ can be a positive voltage between the second primary side contact 132 and the third primary side contact 133 (i.e., the voltage potential of the second primary side contact 132 is higher than the voltage potential of the third secondary side contact 133). Or, the apparatus 100 can be, for example, configured such that, for example, the first voltage Um induced by $U_1$ is a negative voltage between the third primary side contact 133 and the first primary side contact 131 (i.e., the voltage potential of the third primary side contact 133 is lower than the voltage potential of the first secondary side contact 131), and the second voltage $U_{1,2}$ induced by $U_1$ can be a negative voltage between the second primary side contact 132 and the third primary side contact 133 (i.e., the voltage potential of the second primary side contact 132 is lower than the voltage potential of the third secondary side contact 133).

The apparatus 100 is, for example, furthermore configured such that the series connection 152" of the first secondary side winding 121 of the second transformer element 120 and the second secondary side winding 112 of the first transformer element 110, the sense of winding between the first secondary side winding 121 of the second transformer element 120 and the primary side winding 102 of the second transformer element 120, and the sense of winding between the second secondary side winding 112 of the first transformer element 110 and the primary side winding 101 of the first transformer element 110 are designed such that a positive voltage $U_2$ applied between the fourth secondary side contact 144 and the third secondary side contact 143 causes the following: (i) induction of a first voltage $U_{2,1}$ between the third primary side contact 133 and the first primary side contact 131, (ii) induction of a second voltage $U_{2,2}$ between the second primary side contact 132 and the third primary side contact 133, (iii) with the first voltage $U_{2,1}$ having a reverse direction as compared to the second voltage $U_{2,2}$.

According to this exemplary coupling variant for the second channel K2, the apparatus 100 is configured such that such positive voltage $U_2$ applied between the fourth secondary side contact 144 and the third secondary side contact 143 (i.e., the voltage potential of the fourth secondary side contact 144 is higher than the voltage potential of the third secondary side contact 143) causes an induction of a first voltage $U_{2,1}$ between the third primary side contact 133 and the first primary side contact 131 through inductive coupling between the second secondary side winding 112 and the primary side winding 101 of the first transformer element 110 and an induction of a second voltage $U_{2,2}$ between the second primary side contact 132 and the third primary side contact 133 through inductive coupling between the first secondary side winding 121 and the primary side winding 102 of the second transformer element 120 (disregarding the influence of a voltage $U_1$ possibly applied at the first channel K1, i.e., for example, $U_1$ can be assumed to be 0V), with the first voltage $U_{2,1}$ having a reverse direction as compared to the second voltage $U_{2,2}$. This means that the apparatus 100 can be, for example, configured such that, for example, the first voltage $U_{2,1}$ induced by $U_2$ is a negative voltage between the third primary side contact 133 and the first primary side contact 131 (i.e., the voltage potential of the third primary side contact 133 is lower than the voltage potential of the first secondary side contact 131), and the second voltage $U_{2.2}$ induced by $U_2$ can be a positive voltage between the second primary side contact 132 and the third primary side contact 133 (i.e., the voltage potential of the second primary side contact 132 is higher than the voltage potential of the third secondary side contact 133). Or, the apparatus 100 can be, for example, configured such that, for example, the first voltage $U_{2.1}$ induced by $U_2$ is a positive voltage between the third primary side contact 133 and the first primary side contact 131 (i.e., the voltage potential of the third primary side contact 133 is higher than the voltage potential of the first secondary side contact 131), and the second voltage $U_{2.2}$ induced by $U_2$ can be a negative voltage between the second primary side contact 132 and the third primary side contact 133 (i.e., the voltage potential of the second primary side contact 132 is lower than the voltage potential of the third secondary side contact 133).

The following embodiments show various examples of such exemplary coupling variants for the first channel K1 or the second channel K2, based on the apparatus 100 according to a first embodiment as shown in FIG. 1a. Thus, the statements regarding features of apparatus 100 according to the first embodiment apply likewise to the following apparatuses according to the further embodiments.

Figure 2A:
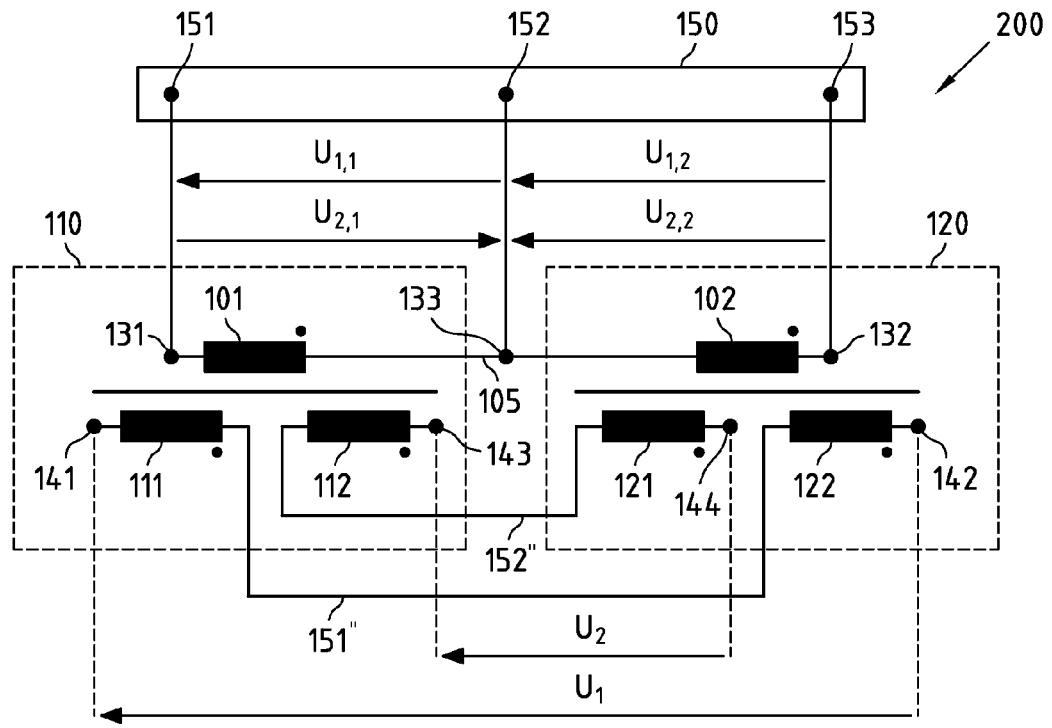
FIG. 2a shows an exemplary apparatus according to a second embodiment.

FIG. 2a shows an exemplary apparatus 200 according to a second embodiment. Apparatus 200 is based on the apparatus 100 according to the first embodiment as shown in FIG. 1.

The apparatus 100 is configured such that the series connection 151″ of the first secondary side winding 111 of the first transformer element 110 and the second secondary side winding 121 of the second transformer element 120, the sense of winding between the first secondary side winding 111 of the first transformer element 110 and the primary side winding 101 of the first transformer element 110, and the sense of winding between the second secondary side winding 121 of the second transformer element 120 and the primary side winding 102 of the second transformer element 120 are designed such that a positive voltage $U_1$ applied between the second secondary side contact 142 and the first secondary side contact 141 causes the above-described coupling variant for channel K1. As shown exemplarily in FIG. 2a, said coupling variant may be achieved, for example, by having the first secondary side winding 111 of the first transformer element 110 and the primary side winding 101 of the first transformer element 110 show the same sense of winding and by having the second secondary side winding 122 of the second transformer element 120 and the primary side winding 102 of the second transformer element 120 show the same sense of winding and by using the series connection 151″ shown in FIG. 2a of the first secondary side winding 111 of the first transformer element 110 and of the second secondary side winding 122 of the second transformer element 120. This means that the apparatus 200 is configured such that, when assuming a positive voltage $U_1$, the first voltage $U_{1.1}$ induced by $U_1$ is a positive voltage between the third primary side contact 133 and the first primary side contact 131 (i.e., the voltage potential of the third primary side contact 133 is higher than the voltage potential of the first secondary side contact 131), and the second voltage $U_{1.2}$ induced by $U_1$ is a positive voltage between the second primary side contact 132 and the third primary side contact 133 (i.e., the voltage potential of the second primary side contact 132 is higher than the voltage potential of the third secondary side contact 133).

The apparatus 200 is configured such that the series connection 152″ of the first secondary side winding 121 of the second transformer element 120 and the second secondary side winding 112 of the first transformer element 110, the sense of winding between the first secondary side winding 121 of the second transformer element 120 and the primary side winding 102 of the second transformer element 120, and the sense of winding between the second secondary side winding 112 of the first transformer element 110 and the primary side winding 101 of the first transformer element 110 are designed such that a positive voltage $U_2$ applied between the fourth secondary side contact 144 and the third secondary side contact 143 causes the above-described coupling variant for channel K2. As shown exemplarily in FIG. 2a, said coupling variant may be achieved, for example, by having the first secondary side winding 121 of the second transformer element 120 and the primary side winding 102 of the second transformer element 120 show the same sense of winding and by having the second secondary side winding 112 of the first transformer element 110 and the primary side winding 101 of the first transformer element 110 show the same sense of winding and by using the series connection 152″ shown in FIG. 2a of the second secondary side winding 112 of the first transformer element 110 and of the first secondary side winding 121 of the second transformer element 120. This means that the apparatus 200 is configured such that, when assuming a positive voltage $U_2$, the first voltage $U_{2.1}$ induced by $U_2$ is a negative voltage between the third primary side contact 133 and the first primary side contact 131 (i.e., the voltage potential of the third primary side contact 133 is lower than the voltage potential of the first secondary side contact 131), and the second voltage $U_{2.2}$ induced by $U_2$ is a positive voltage between the second primary side contact 132 and the third primary side contact 133 (i.e., the voltage potential of the second primary side contact 132 is higher than the voltage potential of the third secondary side contact 133).

Figure 2B:
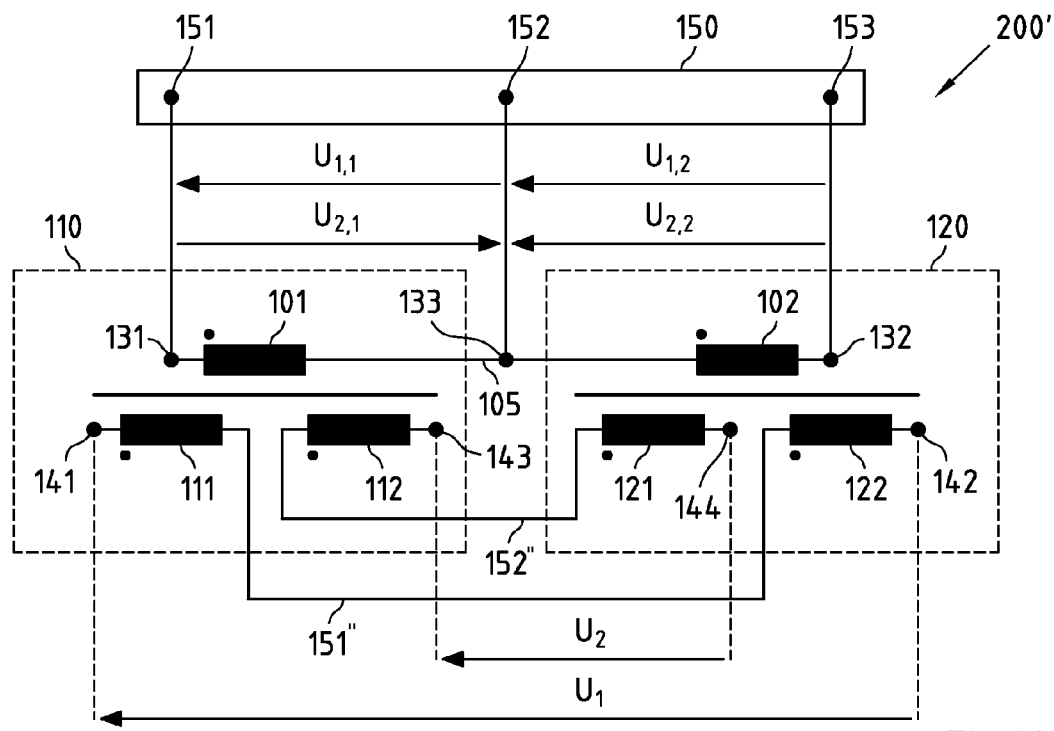
FIG. 2b shows an exemplary apparatus according to a third embodiment.

FIG. 2b shows an exemplary apparatus 200′ according to a third embodiment. Apparatus 200′ is based on the apparatus 200′ according to the second embodiment as shown in FIG. 2a.

Apparatus 200′ differs from the apparatus 200 shown in FIG. 2a only in that all of the windings 101, 102, 111, 112, 121, 122 have a reverse sense of winding. This leads to the same coupling variant for the two channels K1 and K2 as in the apparatus 200 according to the second embodiment. This means that the apparatus 200′ is configured such that, when assuming a positive voltage $U_1$, the first voltage $U_{1.1}$ induced by $U_1$ is a positive voltage between the third primary side contact 133 and the first primary side contact 131 (i.e., the voltage potential of the third primary side contact 133 is higher than the voltage potential of the first secondary side contact 131), and the second voltage $U_{1.2}$ induced by $U_1$ is a positive voltage between the second primary side contact 132 and the third primary side contact 133 (i.e., the voltage potential of the second primary side contact 132 is higher than the voltage potential of the third secondary side contact 133). The apparatus 200′ is moreover configured such that, when assuming a positive voltage $U_2$, the first voltage $U_{2.1}$ induced by $U_2$ is a negative voltage between the third primary side contact 133 and the first primary side contact 131 (i.e., the voltage potential of the third primary side contact 133 is lower than the voltage potential of the first secondary side contact 131), and the second voltage $U_{2.2}$ induced by $U_2$ is a positive voltage between the second primary side contact 132 and the third primary side contact 133 (i.e., the voltage potential of the second primary side contact 132 is higher than the voltage potential of the third secondary side contact 133).

Figure 3A:
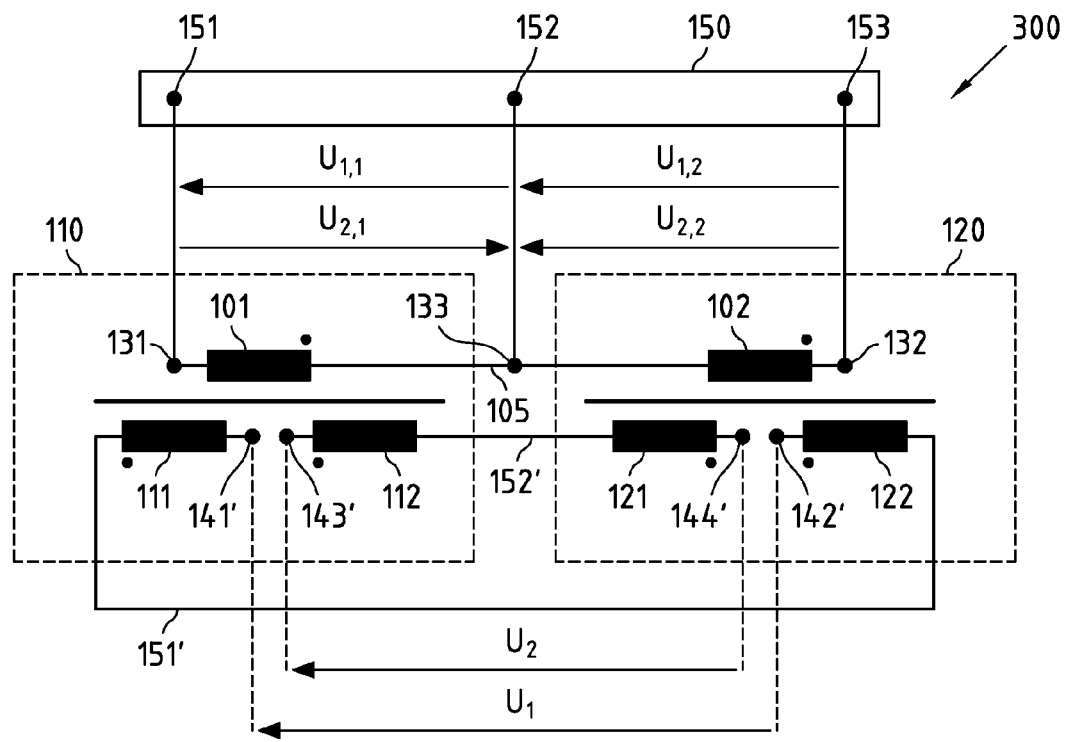
FIG. 3a shows an exemplary apparatus according to a fourth embodiment.

FIG. 3a shows an exemplary apparatus 300 according to a fourth embodiment. Apparatus 300 is based on the apparatus 100 according to the first embodiment, as shown in FIG. 1, and differs from the latter in that it has a different series connection 151' between the first secondary side winding 111 of the first transformer element 110 and the second secondary side winding 122 of the second transformer element 120 and a different series connection 152' between the second secondary side winding 112 of the first transformer element 110 and the first secondary side winding 121 of the second transformer element 120.

The apparatus 300 is configured such that the series connection 151' of the first secondary side winding 111 of the first transformer element 110 and the second secondary side winding 121 of the second transformer element 120, the sense of winding between the first secondary side winding 111 of the first transformer element 110 and the primary side winding 101 of the first transformer element 110, and the sense of winding between the second secondary side winding 121 of the second transformer element 120 and the primary side winding 102 of the second transformer element 120 are designed such that a positive voltage $U_1$ applied between the second secondary side contact 142 and the first secondary side contact 141 causes the above-described coupling variant for channel K1. As shown exemplarily in FIG. 3a, said coupling variant may be achieved, for example, by having the first secondary side winding 111 of the first transformer element 110 and the primary side winding 101 of the first transformer element 110 show an opposite sense of winding and by having the second secondary side winding 122 of the second transformer element 120 and the primary side winding 102 of the second transformer element 120 show an opposite sense of winding and by using the series connection 151' shown in FIG. 3a of the first secondary side winding 111 of the first transformer element 110 and of the second secondary side winding 122 of the second transformer element 120. This means that the apparatus 300 is configured such that, when assuming a positive voltage $U_1$, the first voltage $U_{1,1}$ induced by $U_1$ is a positive voltage between the third primary side contact 133 and the first primary side contact 131 (i.e., the voltage potential of the third primary side contact 133 is higher than the voltage potential of the first secondary side contact 131), and the second voltage $U_{1,2}$ induced by $U_1$ is a positive voltage between the second primary side contact 132 and the third primary side contact 133 (i.e., the voltage potential of the second primary side contact 132 is higher than the voltage potential of the third secondary side contact 133).

The apparatus 300 is moreover configured such that the series connection 152' of the first secondary side winding 121 of the second transformer element 120 and the second secondary side winding 112 of the first transformer element 110, the sense of winding between the first secondary side winding 121 of the second transformer element 120 and the primary side winding 102 of the second transformer element 120, and the sense of winding between the second secondary side winding 112 of the first transformer element 110 and the primary side winding 101 of the first transformer element 110 are designed such that a positive voltage $U_2$ applied between the fourth secondary side contact 144 and the third secondary side contact 143 causes the above-described coupling variant for channel K2. As shown exemplarily in FIG. 3a, said coupling variant may be achieved, for example, by having the first secondary side winding 121 of the second transformer element 120 and the primary side winding 102 of the second transformer element 110 show the same sense of winding and by having the second secondary side winding 112 of the first transformer element 110 and the primary side winding 101 of the first transformer element 110 show an opposite sense of winding and by using the series connection 152" shown in FIG. 3a of the second secondary side winding 112 of the first transformer element 110 and of the first secondary side winding 121 of the second transformer element 120. This means that the apparatus 300 is configured such that, when assuming a positive voltage $U_2$, the first voltage $U_{2,1}$ induced by $U_2$ is a negative voltage between the third primary side contact 133 and the first primary side contact 131 (i.e., the voltage potential of the third primary side contact 133 is lower than the voltage potential of the first secondary side contact 131), and the second voltage $U_{2,2}$ induced by $U_2$ is a positive voltage between the second primary side contact 132 and the third primary side contact 133 (i.e., the voltage potential of the second primary side contact 132 is higher than the voltage potential of the third secondary side contact 133).

Figure 3B:
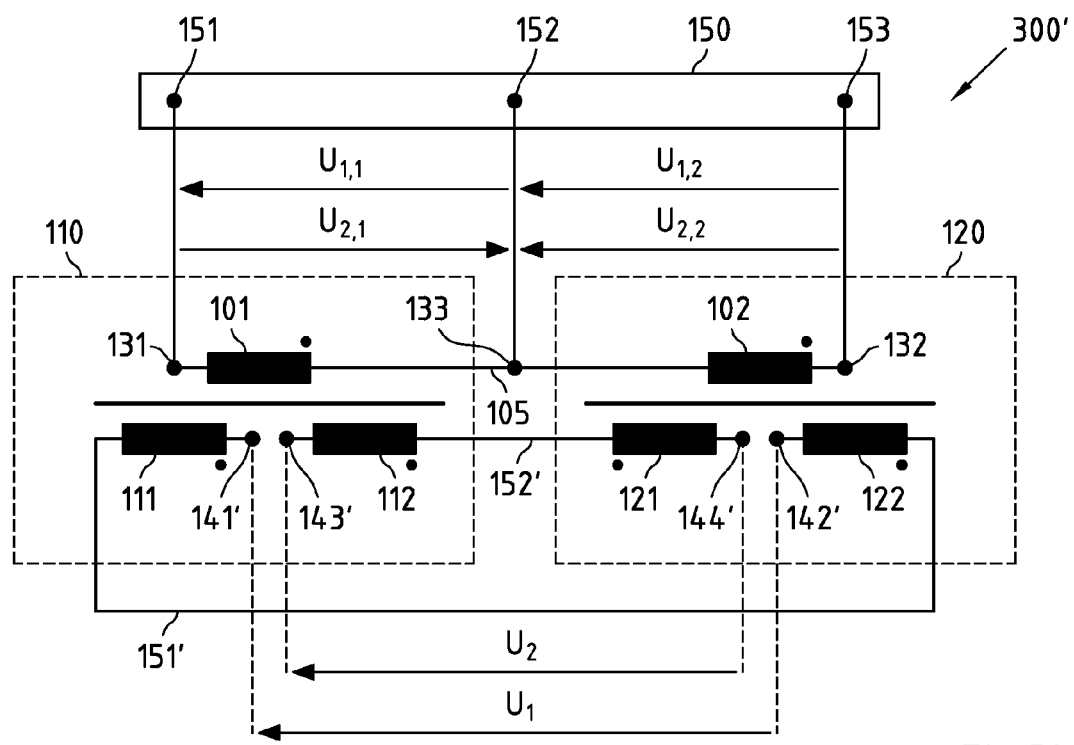
FIG. 3b shows an exemplary apparatus according to a fifth embodiment.

FIG. 3b shows an exemplary apparatus 300' according to a fifth embodiment. Apparatus 300' is based on the apparatus 300 according to the fourth embodiment, as shown in FIG. 3a, and differs from the latter in that some of the windings have a different sense of winding.

The apparatus 300' is configured such that the series connection 151' of the first secondary side winding 111 of the first transformer element 110 and the second secondary side winding 121 of the second transformer element 120, the sense of winding between the first secondary side winding 111 of the first transformer element 110 and the primary side winding 101 of the first transformer element 110, and the sense of winding between the second secondary side winding 121 of the second transformer element 120 and the primary side winding 102 of the second transformer element 120 are designed such that a positive voltage $U_1$ applied between the second secondary side contact 142 and the first secondary side contact 141 causes the above-described coupling variant for channel K1. As shown exemplarily in FIG. 3b, said coupling variant may be achieved, for example, by having the first secondary side winding 111 of the first transformer element 110 and the primary side winding 101 of the first transformer element 110 show the same sense of winding and by having the second secondary side winding 122 of the second transformer element 120 and the primary side winding 102 of the second transformer element 120 show the same sense of winding and by using the series connection 151' shown in FIG. 3b of the first secondary side winding 111 of the first transformer element 110 and of the second secondary side winding 122 of the second transformer element 120. This means that the apparatus 300' is configured such that, when assuming a positive voltage $U_1$, the first voltage $U_{1,1}$ induced by $U_1$ is a negative voltage between the third primary side contact 133 and the first primary side contact 131 (i.e., the voltage potential of the third primary side contact 133 is lower than the voltage potential of the first secondary side contact 131), and the second voltage $U_{1,2}$ induced by $U_1$ is a negative voltage between the second primary side contact 132 and the third primary side contact 133 (i.e., the voltage potential of the second primary side contact 132 is lower than the voltage potential of the third secondary side contact 133).

The apparatus 300' is moreover configured such that the series connection 152' of the first secondary side winding 121 of the second transformer element 120 and the second secondary side winding 112 of the first transformer element 110, the sense of winding between the first secondary side winding 121 of the second transformer element 120 and the primary side winding 102 of the second transformer element 120, and the sense of winding between the second secondary side winding 112 of the first transformer element 110 and the primary side winding 101 of the first transformer element 110 are designed such that a positive voltage $U_2$ applied between the fourth secondary side contact 144 and the third secondary side contact 143 causes the above-described coupling variant for channel K2. As shown exemplarily in FIG. 3b, said coupling variant may be achieved, for example, by having the first secondary side winding 121 of the second transformer element 120 and the primary side winding 102 of the second transformer element 120 show an opposite sense of winding and by having the second secondary side winding 112 of the first transformer element 110 and the primary side winding 101 of the first transformer element 110 show the same sense of winding and by using the series connection 152" shown in FIG. 3b of the second secondary side winding 112 of the first transformer element 110 and of the first secondary side winding 121 of the second transformer element 120. This means that the apparatus 300 is configured such that, when assuming a positive voltage $U_2$, the first voltage $U_{2.1}$ induced by $U_2$ is a positive voltage between the third primary side contact 133 and the first primary side contact 131 (i.e., the voltage potential of the third primary side contact 133 is higher than the voltage potential of the first secondary side contact 131), and the second voltage $U_{2.2}$ induced by $U_2$ is a negative voltage between the second primary side contact 132 and the third primary side contact 133 (i.e., the voltage potential of the second primary side contact 132 is lower than the voltage potential of the third secondary side contact 133).

Figure 4:
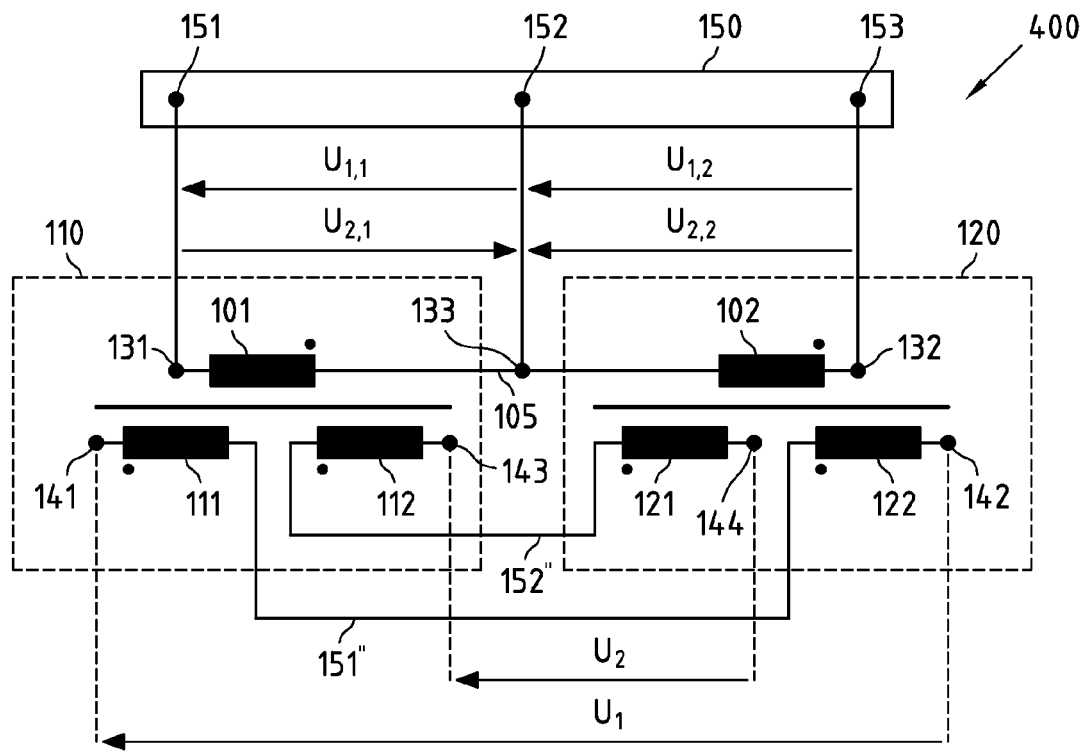
FIG. 4 shows an exemplary apparatus according to a sixth embodiment.

FIG. 4 shows an exemplary apparatus 400 according to a sixth embodiment. Apparatus 400 is based on the apparatus 200 according to the second embodiment, as shown in FIG. 2a, and is also based on the apparatus 200' according to a third embodiment, as shown in FIG. 2b, and differs from them in that some of the windings have a different sense of winding.

The apparatus 400 is configured such that the series connection 151" of the first secondary side winding 111 of the first transformer element 110 and the second secondary side winding 121 of the second transformer element 120, the sense of winding between the first secondary side winding 111 of the first transformer element 110 and the primary side winding 101 of the first transformer element 110, and the sense of winding between the second secondary side winding 121 of the second transformer element 120 and the primary side winding 102 of the second transformer element 120 are designed such that a positive voltage $U_1$ applied between the second secondary side contact 142 and the first secondary side contact 141 causes the above-described coupling variant for channel K1. As shown exemplarily in FIG. 4, said coupling variant may be achieved, for example, by having the first secondary side winding 111 of the first transformer element 110 and the primary side winding 101 of the first transformer element 110 show an opposite sense of winding and by having the second secondary side winding 122 of the second transformer element 120 and the primary side winding 102 of the second transformer element 120 show an opposite sense of winding and by using the series connection 151" shown in FIG. 4 of the first secondary side winding 111 of the first transformer element 110 and of the second secondary side winding 122 of the second transformer element 120. This means that the apparatus 400 is configured such that, when assuming a positive voltage $U_1$, the first voltage $U_{1.1}$ induced by $U_1$ is a negative voltage between the third primary side contact 133 and the first primary side contact 131 (i.e., the voltage potential of the third primary side contact 133 is lower than the voltage potential of the first secondary side contact 131), and the second voltage $U_{1.2}$ induced by $U_1$ is a negative voltage between the second primary side contact 132 and the third primary side contact 133 (i.e., the voltage potential of the second primary side contact 132 is lower than the voltage potential of the third secondary side contact 133).

The apparatus 400 is configured such that the series connection 152" of the first secondary side winding 121 of the second transformer element 120 and the second secondary side winding 112 of the first transformer element 110, the sense of winding between the first secondary side winding 121 of the second transformer element 120 and the primary side winding 102 of the second transformer element 120, and the sense of winding between the second secondary side winding 112 of the first transformer element 110 and the primary side winding 101 of the first transformer element 110 are designed such that a positive voltage $U_2$ applied between the fourth secondary side contact 144 and the third secondary side contact 143 causes the above-described coupling variant for channel K2. As shown exemplarily in FIG. 4, said coupling variant may be achieved, for example, by having the first secondary side winding 121 of the second transformer element 120 and the primary side winding 102 of the second transformer element 110 show an opposite sense of winding and by having the second secondary side winding 112 of the first transformer element 110 and the primary side winding 101 of the first transformer element 110 show an opposite sense of winding and by using the series connection 152" shown in FIG. 4 of the second secondary side winding 112 of the first transformer element 110 and of the first secondary side winding 121 of the second transformer element 120. This means that the apparatus 200 is configured such that, when assuming a positive voltage $U_2$, the first voltage $U_{2.1}$ induced by $U_2$ is a positive voltage between the third primary side contact 133 and the first primary side contact 131 (i.e., the voltage potential of the third primary side contact 133 is higher than the voltage potential of the first secondary side contact 131), and the second voltage $U_{2.2}$ induced by $U_2$ is a negative voltage between the second primary side contact 132 and the third primary side contact 133 (i.e., the voltage potential of the second primary side contact 132 is lower than the voltage potential of the third secondary side contact 133).

Figure 5:
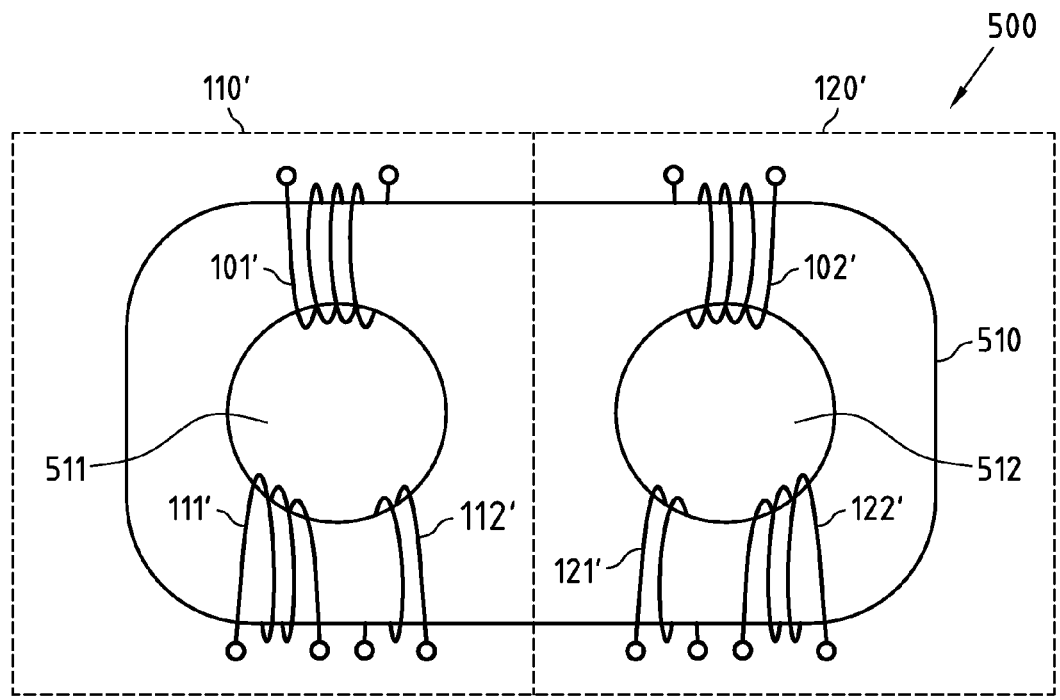
FIG. 5 shows an exemplary arrangement of a first transformer element and second transformer element in a multi-hole core transformer.

FIG. 5 shows an exemplary arrangement 500 of a first transformer element 110' and a second transformer element 120' in a multi-hole core transformer 510. In said exemplary arrangement 500, the multi-hole core transformer is a double-hole core transformer 510 having a first hole 511 and a second hole 512.

The first transformer element 110' and the second transformer element 120' in FIG. 5 may be used for any first transformer element 110 and any second transformer element 120' in apparatuses 100, 200, 200', 300, 300' and 400 according to the first through sixth embodiment, with the first transformer element 110' having a primary side winding 101' to which any of the aforementioned primary side windings 101 may correspond, so that the multi-hole core transformer 500, as shown in FIG. 5, including the first transformer element 110' and the second transformer element 120', may be used in apparatuses 100, 200, 200', 300, 300' and 400 for the transformer elements 110 and 120 shown therein, with the first and second secondary side winding 111' and 112' of the first transformer element 110' of arrangement 500 each being the first and second secondary side winding 111 and 112 of the first transformer element 110 of one of the apparatuses 100, 200, 200', 300, 300', 400 and the first and second secondary side winding 121' and 122' of the second transformer element 120' of the arrangement 500 each being the first and second secondary side winding 121 and 122 of the second transformer element 120 of said apparatuses 100, 200, 200', 300, 300', 400. This means that the multi-hole core transformer 510 may be used for any of the apparatuses 100, 200, 200', 300, 300' and 400 according to the first through sixth embodiment.

The primary side winding 101' and the first and second secondary side windings 111', 112' of the first transformer element 110' are wound about a first joint hole 511 of the multi-hole core transformer 510. Thus, the primary side winding 101', the first secondary side winding 111' and the second secondary side winding 112' of the first transformer element 110' are such arranged on one part of the multi-hole core surrounding the first hole 511 such that essentially the same first magnet flux flows through the primary side winding 101', the first secondary side winding 111' and the second secondary side winding 112' of the first transformer element 110'.

The primary side winding 102' and the first and second secondary side windings 121', 122' of the second transformer element 120' are wound about a second joint hole 512 of the multi-hole core transformer 510. The primary side winding 102', the first secondary side winding 121' and the second secondary side winding 122' of the second transformer element 120' are thus arranged on one part of the multi-hole core surrounding the second hole 512 such that essentially the same second magnet flux flows through the primary side winding of the second transformer element, the first secondary side winding and the second secondary side winding of the second transformer element.

Using a multi-hole core transformer 510 instead of two individual transformers for the first or respectively second transformer element 110, 120 allows, for example, for reducing the costs and, at the same time, space requirements, as only one transformer is being used.

Using a multi-hole core transformer may, moreover, allow for improved broadband transmission characteristics over single-hole core transformers, in particular when, for example, striving for a good coupling between windings with a relatively low number of windings across a wide frequency range, as is the case with the broadband frequency range of a PLC signal.

Figure 6A:
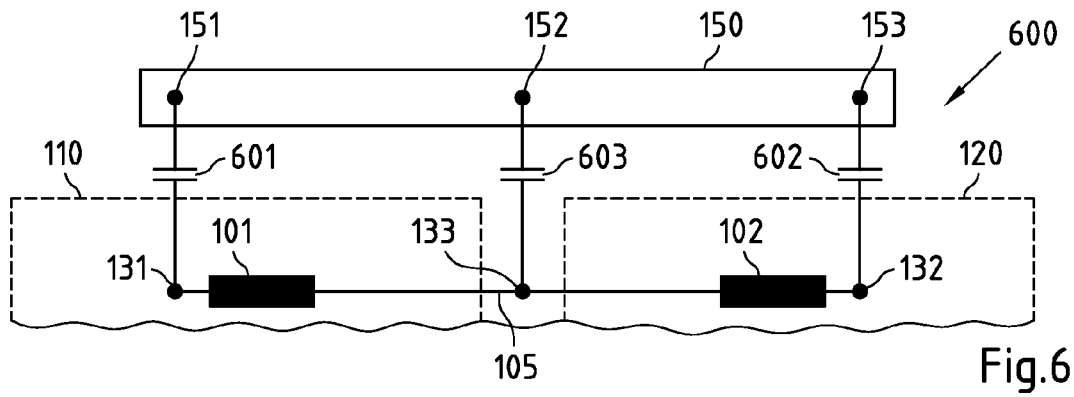
FIG. 6a shows an exemplary apparatus according to a seventh embodiment.

FIG. 6a shows an exemplary apparatus 600 according to a seventh embodiment that constitutes various primary side optional high-frequency couplings 601, 602, 603 that can be used for connecting the first primary side contact 131 to the first contact 151 of the mains connection 150, the second primary side contact 132 to the second contact 152 of the mains connection 150 and the third primary side contact 133 to the third contact 153 of the mains connection 150. Said high-frequency couplings may be used, for example, for any of the apparatuses 100, 200, 200', 300, 300' and 400 according to the first through sixth embodiment shown in FIG. 1a through 4, wherein said apparatuses 100, 200, 200', 300, 300' and 400 may also use, for example, the multi-hole core transformer 510 shown in FIG. 5.

A capacitor 601 may be arranged, for example, between the first primary side contact 131 and the first contact 151 of the mains connection 150, and/or a capacitor 602 may be arranged, for example, between the second primary side contact 132 and the second contact 152 of the mains connection 150, and/or a capacitor 603 may be arranged, for example, between the third primary side contact 133 and the third contact 153 of the mains connection 150.

Figure 6B:
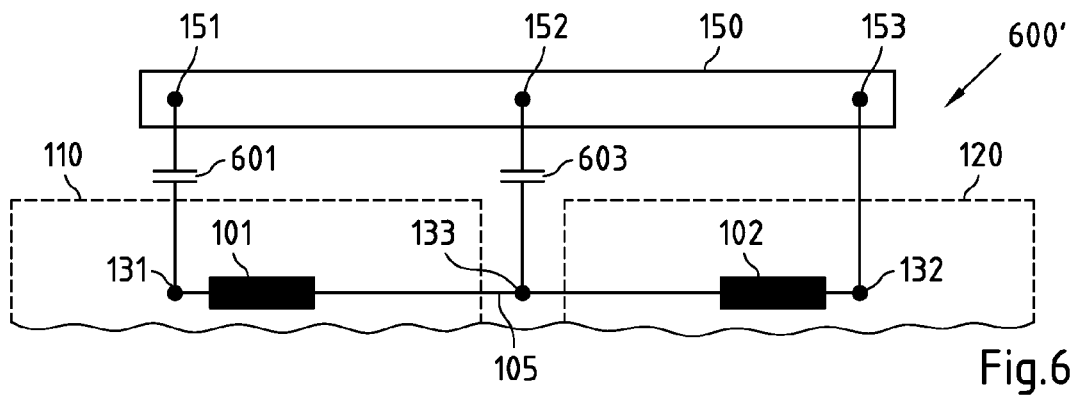
FIG. 6b shows an exemplary apparatus according to an eighth embodiment.

FIG. 6b shows an exemplary apparatus 600' according to an eighth embodiment that constitutes a high-frequency coupling variant of apparatus 600 according to the seventh embodiment. In apparatus 600', the capacitor 601 is arranged between the first primary side contact 131 and the first contact 151 of the mains connection 150, and capacitor 603 is arranged between the third primary side contact 133 and the third contact 153 of the mains connection 150 while, for example, no capacitor is arranged between the second primary side contact 132 and the second contact 152 of the mains connection 150.

Figure 6C:
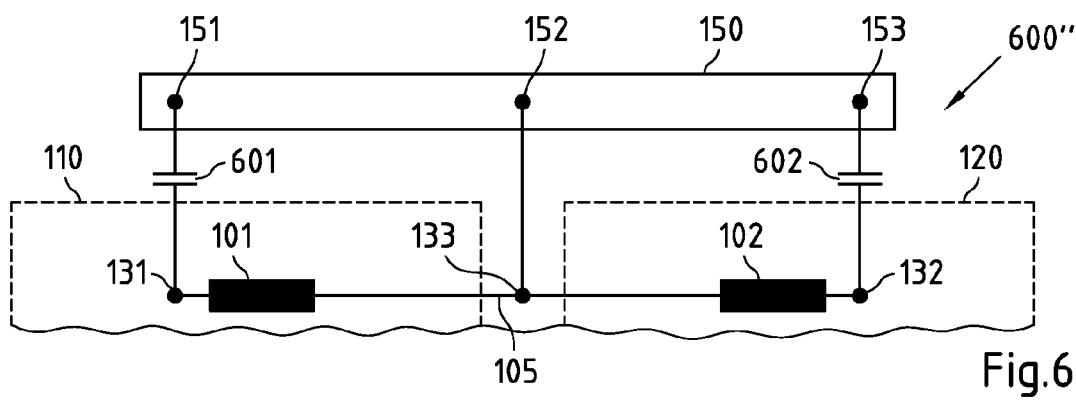
FIG. 6c shows an exemplary apparatus according to a ninth embodiment.

FIG. 6c shows an exemplary apparatus 600'' according to a ninth embodiment that constitutes a high-frequency coupling variant of apparatus 600 according to the seventh embodiment. In apparatus 600'', the capacitor 601 is arranged between the first primary side contact 131 and the first contact 151 of the mains connection 150, and capacitor 602 is arranged between the second primary side contact 132 and the second contact 152 of the mains connection 150 while, for example, no capacitor is arranged between the third primary side contact 133 and the third contact 153 of the mains connection 150.

Figure 6D:
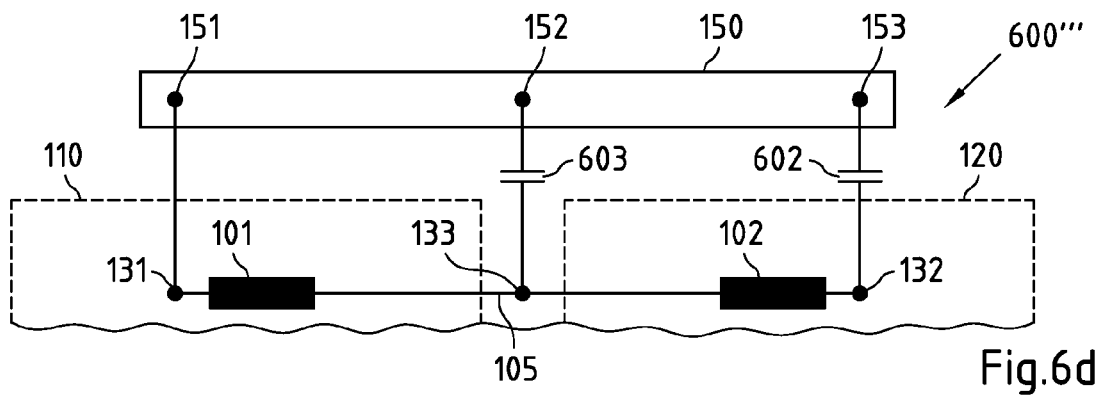
FIG. 6d shows an exemplary apparatus according to a tenth embodiment.

FIG. 6d shows an exemplary apparatus 600''' according to a tenth embodiment that constitutes a high-frequency coupling variant of apparatus 600 according to the seventh embodiment. In apparatus 600''', the capacitor 603 is arranged between the third primary side contact 133 and the third contact 153 of the mains connection 150, and capacitor 602 is arranged between the second primary side contact 132 and the second contact 152 of the mains connection 150 while, for example, no capacitor is arranged between the first primary side contact 131 and the first contact 151 of the mains connection 150.

The invention claimed is:

1. Apparatus for coupling a modem to a power supply network for transmitting data via the power supply network, comprising:
   a mains connection configured to connect the apparatus with a phase conductor, a neutral conductor and a protective earth conductor of the power supply network,
   a first transformer element comprising a primary side winding, a first secondary side winding and a second secondary side winding,
   a second transformer element comprising a primary side winding, a first secondary side winding and a second secondary side winding,
   wherein the primary side winding of the first transformer element is connected in series to the primary side winding of the second transformer element,
   wherein the first secondary side winding of the second transformer element is connected in series to the second secondary side winding of the first transformer element,
   wherein the first secondary side winding of the first transformer element is connected in series to the second secondary side winding of the second transformer element,
   a first primary side contact that is arranged at the end of the primary side winding of the first transformer element facing away from the primary side winding of the second transformer element,
   a second primary side contact that is arranged at the end of the primary side winding of the second transformer element facing away from the primary side winding of the first transformer element,
   a third primary side contact that is arranged between the primary side winding of the first transformer element and the primary side winding of the second transformer element,
   a first secondary side contact that is arranged at the end of the first secondary side winding of the first transformer element facing away from the second secondary side winding of the second transformer element,
   a second secondary side contact that is arranged at the end of the second secondary side winding of the second transformer element facing away from the first secondary side winding of the first transformer element,
a third secondary side contact that is arranged at the end of the second secondary side winding of the first transformer element facing away from the first secondary side winding of the second transformer element,
a fourth secondary side contact that is arranged at the end of the first secondary side winding of the second transformer element facing away from the second secondary side winding of the first transformer element,
wherein the first primary side contact, the second primary side contact and the third primary side contact are each configured to be connected via the mains connection to a different conductor chosen in each case from the phase conductor, the neutral conductor and the protective earth conductor of the power supply network,
wherein the apparatus is configured to couple at least in terms of high frequency a first secondary side transmission channel, which is formed between the first and second secondary side contact, to the power supply network via the first and second transformer element; and
wherein the apparatus is configured to couple at least in terms of high frequency a second secondary side transmission channel, which is formed between the third and fourth secondary side contact, to the power supply network via the first and second transformer element.

2. Apparatus according to claim 1, wherein the first transformer element and the second transformer element are each part of a joint multi-hole core transformer.

3. Apparatus according to claim 2, wherein the multi-hole core transformer constitutes a double-hole core transformer having a first hole and a second hole, with the primary side winding and the first and second secondary side windings of the first transformer element being wound about the first hole of the double-hole core transformer and with the primary side winding and the first and second secondary side winding of the second transformer element being wound about the second hole of the double-hole core transformer.

4. Apparatus according to claim 1, wherein the series connection of the first secondary side winding of the second transformer element and the second secondary side winding of the first transformer element, the sense of winding between the first secondary side winding of the second transformer element and the primary side winding of the second transformer element, and the sense of winding between the second secondary side winding of the first transformer element and the primary side winding of the first transformer element are arranged such that a positive voltage applied between the fourth secondary side contact and the third secondary side contact causes the following:
induction of a first voltage between the third primary side contact and the first primary side contact,
induction of a second voltage between the second primary side contact and the third primary side contact,
with the first voltage having a reverse direction compared to the direction of the second voltage.

5. Apparatus according to claim 4, wherein the positive voltage applied between the fourth secondary side contact and the third secondary side contact causes one of the following:
induction of the first voltage as negative voltage between the third primary side contact and the first primary side contact, and induction of the second voltage as positive voltage between the second primary side contact and the third primary side contact; and
induction of the first voltage as positive voltage between the third primary side contact and the first primary side contact, and induction of the second voltage as negative voltage between the second primary side contact and the third primary side contact.

6. Apparatus according to claim 1, wherein the series connection of the first secondary side winding of the first transformer element and the second secondary side winding of the second transformer element, the sense of winding between the first secondary side winding of the first transformer element and the primary side winding of the first transformer element, and the sense of winding between the second secondary side winding of the second transformer element and the primary side winding of the second transformer element are arranged such that a positive voltage applied between the second secondary side contact and the first secondary side contact causes the following:
induction of a first voltage between the third primary side contact and the first primary side contact,
induction of a second voltage between the second primary side contact and the third primary side contact,
with the first voltage having the same direction compared to the direction of the second voltage.

7. Apparatus according to claim 6, wherein the positive voltage applied between the second secondary side contact and the first secondary side contact causes one of the following:
induction of the first voltage as positive voltage between the third primary side contact and the first primary side contact, and induction of the second voltage as positive voltage between the second primary side contact and the third primary side contact; and
induction of the first voltage as negative voltage between the third primary side contact and the first primary side contact, and induction of the second voltage as negative voltage between the second primary side contact and the third primary side contact.

8. Apparatus according to claim 1, wherein a winding ratio between the primary side winding of the first transformer element and the primary side winding of the second transformer element, a winding ratio between the first secondary side winding of the first transformer element and the second secondary side winding of the second transformer element, and the winding ratio between the second secondary side winding of the first transformer element and the first secondary side winding of the second transformer element is approximately 1:1.

9. Apparatus according to claim 1, wherein a winding ratio between the first secondary side winding of the first transformer element and the primary side winding of the first transformer element and a winding ratio between the second secondary side winding of the second transformer element and the primary side winding of the second transformer element each show one of the following ratios:
approximately 1:1; and
approximately between 1:1 and 2:1.

10. Apparatus according to claim 1, wherein a winding ratio between the second secondary side winding of the first transformer element and the primary side winding of the first transformer element and a winding ratio between the first secondary side winding of the second transformer element and the primary side winding of the second transformer element each show one of the following ratios:
approximately 1:1; and
approximately between 2:1 and 4:1.

11. Apparatus according to claim 1, wherein the first primary side contact is arranged for being connected to a first conductor chosen from the phase conductor and the neutral conductor and that the second primary side contact is arranged for being connected to a second conductor chosen from the phase conductor and the neutral conductor, wherein the first conductor and second conductor are different from each other, with the third primary side contact being arranged to be connected to the protective earth conductor.

12. Modem for transmitting data via a power supply network comprising the apparatus according to claim 1, with the modem being connected to the power supply network via the first secondary side transmission channel with the first and second secondary side contact of the apparatus for coupling the modem, and with the modem being connected to the power supply network via the second secondary side transmission channel with the third and fourth secondary side contact for coupling the modem.

13. Apparatus according to one of the above claims, wherein the mains connection comprises a safety plug with a protective earth contact which is compatible with a NEMA connector.

* * * * *